(12) United States Patent
Tanifuji et al.

(10) Patent No.: US 12,019,722 B2
(45) Date of Patent: Jun. 25, 2024

(54) SYSTEM, DEVICE AND METHOD FOR AUTHENTICATION WITH USE OF INFORMATION CODE

(71) Applicant: DENSO WAVE INCORPORATED, Chita (JP)

(72) Inventors: Yuri Tanifuji, Chita-gun (JP); Soichi Tano, Chita-gun (JP)

(73) Assignee: DENSO WAVE INCORPORATED, Aichi-Pref. (JP)

(*) Notice: Subject to any disclaimer, the term of this patent is extended or adjusted under 35 U.S.C. 154(b) by 416 days.

(21) Appl. No.: 17/424,031

(22) PCT Filed: Jan. 16, 2020

(86) PCT No.: PCT/JP2020/001180
§ 371 (c)(1),
(2) Date: Jul. 19, 2021

(87) PCT Pub. No.: WO2020/149339
PCT Pub. Date: Jul. 23, 2020

(65) Prior Publication Data
US 2022/0101651 A1    Mar. 31, 2022

(30) Foreign Application Priority Data

Jan. 17, 2019 (JP) ................................ 2019-005859
Dec. 19, 2019 (JP) ................................ 2019-229230

(51) Int. Cl.
*G06F 21/32* (2013.01)
*G06K 7/14* (2006.01)
(Continued)

(52) U.S. Cl.
CPC ........... *G06F 21/32* (2013.01); *G06K 7/1413* (2013.01); *G06K 7/1417* (2013.01);
(Continued)

(58) Field of Classification Search
CPC .... G06K 7/1413; G06K 7/1417; G06F 21/32; G06V 40/166; G06V 40/171;
(Continued)

(56) References Cited

U.S. PATENT DOCUMENTS

2007/0226509 A1    9/2007   Senga et al.
2018/0181737 A1*   6/2018   Tussy ................... G06V 40/172

FOREIGN PATENT DOCUMENTS

CN    105261105 A  *  1/2016
JP    2008071172 A  *  3/2008
(Continued)

OTHER PUBLICATIONS

A machine translated English version of the document CN 105261105. (Year: 2016).*

(Continued)

*Primary Examiner* — Ruiping Li
(74) *Attorney, Agent, or Firm* — Oliff PLC

(57) ABSTRACT

A user authentication system uses an information code such as a two-dimensional information code. The authentication system includes an authentication device, and the user is authenticated by combining the authentication device with a user's mobile terminal. In the mobile terminal, an authentication code in which facial feature points extracted from user's facial images are recorded is stored in the memory. In the authentication device, facial feature points are extracted from images of a human's face captured by an imaging unit, after being determined to be in a facial recognizable state, and the authentication code is displayed on the screen of the mobile terminal. The e facial feature points recorded in the authentication code are read from the captured images of the authentication code. The extracted facial feature points and the read facial feature points are subject to matching with each other in order to authenticate the user.

24 Claims, 8 Drawing Sheets

(51) Int. Cl.
  *G06V 40/16* (2022.01)
  *G06V 40/40* (2022.01)
  *G06V 40/50* (2022.01)
  *G06V 40/70* (2022.01)

(52) U.S. Cl.
  CPC .......... *G06V 40/166* (2022.01); *G06V 40/171* (2022.01); *G06V 40/172* (2022.01); *G06V 40/40* (2022.01); *G06V 40/53* (2022.01); *G06V 40/55* (2022.01); *G06V 40/70* (2022.01)

(58) Field of Classification Search
  CPC ...... G06V 40/172; G06V 40/40; G06V 40/53; G06V 40/55; G06V 40/70
  See application file for complete search history.

(56) References Cited

FOREIGN PATENT DOCUMENTS

| | | | |
|---|---|---|---|
| JP | 2014-219704 | A | 11/2014 |
| JP | 2014-222445 | A | 11/2014 |
| WO | 2013/131407 | A1 | 9/2013 |

OTHER PUBLICATIONS

Marcel, S. et al., "Handbook of Biometric Anti-Spoofing: Trusted Biometrics Under Spoofing Attacks," 2014, http://ebookcentral.proquest.com/lib/epo-ebooks/detail.action?docID=1781974.

* cited by examiner

SYSTEM, DEVICE AND METHOD FOR AUTHENTICATION WITH USE OF INFORMATION CODE

CROSS-REFERENCE TO RELATED APPLICATION

This application is based on and claims the benefit of priority from earlier Japanese Patent Application No. 2019-229230 filed on Dec. 19, 2019 the description of which is incorporated herein by reference.

BACKGROUND

Technical Field

The present disclosure relates to a system, device and method for performing authentication with use of an information code.

Background Art

In recent years, the authentication system may be required to have a high degree of security. As such an authentication system, a system using human face authentication may be conventionally adopted. A system using such face recognition requires a large-scale system configuration. Therefore, it is installed and used in places where high security is required.

On the other hand, the authentication system may also be used for qualification tests held at universities and concerts and events held at hall venues. Such an authentication system is required to have relatively high security while having a simpler configuration. As an example of such an authentication system, that is, a system that requires a simple configuration and relatively high security, the authentication system disclosed in Patent Document 1 below is known.

In the authentication system illustrated in Patent Document 1, an authentication code that records information about the facial feature points of the user is generated on the server. Furthermore, this authentication code is stored in the user's mobile terminal. This authentication system includes an authentication device. In the authentication device, the authentication code displayed on the mobile terminal is imaged by the information code reading unit. In addition, the imaging unit captures the user's face. Further, the facial feature points read from the captured authentication code is matched (collated) with the facial feature points extracted from the captured image of the user's face. The user is authenticated based on the collation result. In this way, the user causes the authentication device to image the authentication code acquired in advance and the user's own face. Only by this imaging, the user can perform authentication using his/her facial feature points.

CITATION LIST

Patent Literature

[PTL 1] JP 2014-222445 A

By the way, in Patent Document 1, the authentication code is imaged by the information code reading unit, while the face of the user is imaged by the imaging unit. Information for authentication is acquired by these two imaging processes. That is, since two imaging means are required, the installation location of each imaging means may be limited. Further, since two imaging means are required, it is assumed that the user may not be able to image well depending on the installation status of the authentication device provided with both imaging means.

SUMMARY

It is thus required to provide a configuration that enables authentication by taking an image of the user's face without being aware of the existence of the imaging unit and using the facial feature points extracted from the facial image.

Solution to Problem

In order to realize the object, there is provided an exemplified example which is a first mode of the present disclosure is an authentication system, characterized in that the authentication system comprises:
an information code recording medium to be carried by a user; and
an authentication device for authenticating the user, wherein
the information code recording medium in which an information code is recorded, facial feature points being extracted from a facial image of the user and being recorded in the information code; and
the authentication device comprises
an imaging unit;
a determination unit configured to determine whether or not a facial recognizable state is provided where a user's face is imaged recognizably by the imaging unit;
an extraction unit configured to extract facial feature points from an image of the user's face imaged by the imaging unit, after the determination unit has determined the facial recognizable state;
a reading unit configured to read information indicating the facial feature points recorded in the information code, from an image provided by the imaging unit which images the information code recorded in the information code recording medium;
a matching unit configured to perform matching between the facial feature points extracted by the extraction unit and the facial feature points read by the reading unit; and
an authentication unit configured to authenticate the user based on matching results performed by the matching unit.

In addition, there is provided an exemplary embodiment according to a second embodiment of present disclosure, which is related to an authentication device for authenticating a user who holds an information code thereover, facial feature points extracted from a facial image of the user, characterized in that the authentication device comprises:
an imaging unit;
a determination unit configured to determine whether or not a facial recognizable state is provided where a user's face is imaged recognizably by the imaging unit;
an extraction unit configured to extract facial feature points from an image of the user's face imaged by the imaging unit, after the determination unit has determined the facial recognizable state;
a reading unit configured to read information indicating the facial feature points recorded in the information code, from an image provided by the imaging unit which images the information code;

a matching unit configured to perform matching between the facial feature points extracted by the extraction unit and the facial feature points read by the reading unit; and an authentication unit configured to authenticate the user based on matching results performed by the matching unit.

There is also provided an exemplary embodiment according to a third embodiment of present disclosure, which is related to an authentication method for authenticating a user who holds an information code thereover, facial feature points extracted from a facial image of the user, characterized in that the authentication method comprises:

an imaging step imaging a face of the user by an imaging unit (23);

a determination step determining whether or not a facial recognizable state is provided where the user's face is imaged recognizably in the imaging step;

an extraction step extracting facial feature points from an image of the user's face imaged by the imaging unit, after the determination step has determined the facial recognizable state;

a reading step reading information indicating the facial feature points recorded in the information code, from an image provided by the imaging unit which images the information code;

a matching step performing matching between the facial feature points extracted in the extraction step and the facial feature points read in the reading step; and an authentication step authenticating the user based on matching results performed in the matching step.

In the forgoing configurations, the reference numerals in brackets show, just as examples, practical elements described in the embodiments which will be detailed later.

In the exemplary embodiment according to the first aspect of the present disclosure, the information code recording medium includes an information code in which facial feature points extracted from the facial image of the user are recorded. Then, in the authentication device, after the determination unit determines the facial recognizable state, the facial feature point is extracted by the extraction unit from the captured image of the human face captured by the imaging unit. At the same time, the reading unit reads the information about the facial feature point recorded in the information code from the captured image obtained by capturing the information code displayed on the information code recording medium by the imaging unit. Then, the facial feature points extracted by the extraction unit and the facial feature points read by the reading unit are collated by the matching unit. Based on this verification result, the user is authenticated by the authentication unit.

As a result, the user causes the imaging unit of the authentication device to image his/her face and the information code displayed on the information code recording medium. With this kind of operation, authentication using facial feature points can be performed. In particular, one imaging unit also serves as an imaging means for imaging the user's face and an imaging means for imaging the information code displayed on the information code recording medium. Therefore, the user operates by holding the information code over the imaging unit while looking at the imaging unit. In such a case, before the information code is imaged, the face of the user who is holding the information code can be recognizable by the imaging unit without the user being aware of it. Further, it is not necessary for the user to perform a stationary operation with respect to the imaging unit in order to image the user's face. Therefore, before reading the information code, it is possible to start a process for photographing the user's face and extracting its facial feature points. Therefore, the time from holding the information code over the imaging unit to obtaining the matching result by the matching unit is shortened. The authentication time recognized by the user can be shortened.

For example, a display unit is provided to indicate a state in which the information code can be read in a predetermined display state.

The imaging unit is placed at a position within the field of view of the user viewing the display unit. As a result, the user can visually recognize that the display unit is in a predetermined display state when he/she tries to hold the information code over the imaging unit. Therefore, the imaging unit existing in the user's field of view enables the user's face to be imaged in a more recognizable state. Therefore, the authentication accuracy can be improved.

Further, for example, the facial feature points extracted by the extraction unit are temporarily stored in the storage unit and deleted after a certain period of time.

The merits of this are as follows. For example, the information code may not be read because the information code recording medium is not held properly. Even in that case, the extracted facial feature points are retained for a certain period of time. Therefore, since the information code is appropriately read during this fixed time, it is possible to eliminate the trouble of recognizably imaging the user's face again. On the other hand, the extracted facial feature points are not remembered after a certain period of time. Therefore, even if the face of another person different from the authentication target is unintentionally imaged, the facial feature points can be appropriately erased.

Further, for example, under predetermined conditions, the lighting unit is controlled by the control unit so that the lighting state when the human face is imaged by the imaging unit and the lighting state when the information code is imaged by the imaging unit are different.

As a result, for example, even when the same imaging unit is used under predetermined conditions such as ambient brightness, an imaging state suitable for imaging a human face and an imaging state suitable for imaging an information code can be switched. Therefore, the extraction accuracy of the facial feature point and the reading accuracy of the information code are improved, and as a result, the authentication accuracy can be improved.

Further, preferably, the determination unit determines that it is in a facial recognizable state when the face of a person imaged recognizably becomes larger in the images consecutively imaged by the imaging unit.

When a third party captures a facial photograph or the like displayed on the screen of the mobile terminal on the imaging unit, even if it is recognized as a human face, a facial recognizable state cannot be provided unless the person's face gradually grows. It is not judged that. Therefore, even if a facial photograph is taken for an illegal purpose, it is unlikely to be erroneously determined to be in a facial recognizable state. This can prevent spoofing.

Further, the determination unit determines that it is a facial recognizable state when the inclination of the center line regarding the human face recognizably imaged is within a predetermined angular range with respect to the reference line in the captured image of the imaging unit.

When a third party captures a face photo or the like displayed on the screen of the mobile terminal on the imaging unit, the face photo may be tilted. In this case, in the captured image, the center line related to the face is inclined with respect to the vertical straight line (line along the direction of gravity). On the other hand, when an image of a person walking toward an imaging unit is taken, the inclination of the center line for the face in the image is sufficiently small. That is, the inclination of the center line of the human face recognizable with respect to the reference line such as the vertical line in the image captured by the imaging unit may not be within the predetermined angular range. In this case, there is a possibility that a face photograph is taken. Therefore, when the inclination of the center line relating to the recognizable image of a person's face falls within a predetermined angular range, it is determined to be a facial recognizable state. On the contrary, when the center line does not fall within the predetermined angular range, it is determined that the state is not a facial recognizable state. Therefore, even if a facial photograph is taken for an illegal purpose, it is difficult to erroneously determine that the facial photograph is in a facial recognizable state if the facial photograph is greatly tilted. Therefore, spoofing can be prevented.

Further, preferably, the determination unit determines that it is a facial recognizable state when it can be recognized that the face of a person who is recognizably imaged is blinking in the consecutive images obtained by the imaging unit.

When a third party captures a face photograph or the like displayed on the screen of the mobile terminal on the imaging unit, even if it is recognized as a human face, it is not determined to be in a facial recognizable state because it cannot blink. Therefore, even if a facial photograph is taken for an illegal purpose, it is not erroneously determined to be in a facial recognizable state. Therefore, spoofing can be prevented.

Further, in the consecutive imaging by the imaging unit, when the range of the shadow on the human face captured recognizably changes, it may be determined that the facial recognizable state is obtained.

It is also assumed that a third party may have the imaging unit take a picture of the face displayed on the screen of the mobile terminal. Even in this case, even if the face is recognized as a human face, the range of the shadow on the face does not change, so that the facial recognizable state is not determined. Therefore, even if a facial photograph is taken for an illegal purpose, it is not erroneously determined to be in a facial recognizable state. It is possible to prevent spoofing.

Further, the determination unit may be determined to be a facial recognizable state when the depth is recognized with respect to the human face recognizable by the imaging unit.

When a third party captures a face photograph or the like displayed on the screen of the mobile terminal on the imaging unit, even if it is recognized as a human face, the depth of the face may not be recognized. In this case, it is not determined to be a facial recognizable state. Therefore, even if a facial photograph is taken for an illegal purpose, it is not erroneously determined to be in a facial recognizable state. It is possible to prevent spoofing.

In the exemplary embodiment according to the second aspect of the present disclosure, an authentication device having the same effect as that of claim 1 can be realized.

Further, in the exemplary embodiment according to the third aspect of the present disclosure, an authentication method having the same effect as that of claim 1 can be realized.

DESCRIPTION OF THE EMBODIMENTS

First Embodiment

Hereinafter, an embodiment of the authentication system, an authentication device, and an authentication method according to a first embodiment of the present disclosure based on the present invention will now be described with reference to the drawings. The authentication system 10 shown in FIGS. 1A and 1B includes the authentication device 20 as one of the main elements. The authentication system 10 is configured as a system for personally authenticating the user by using an information code (hereinafter, also referred to as an authentication code C). In the information code (hereinafter, also referred to as the authentication code C, if necessary), various information including facial feature points extracted from the user's facial image and personal information are recorded in advance. The authentication system 10 also includes a mobile terminal 30 that functions as an information code recording medium carried by the user when understood as a system in a broad sense.

Figure 1A:
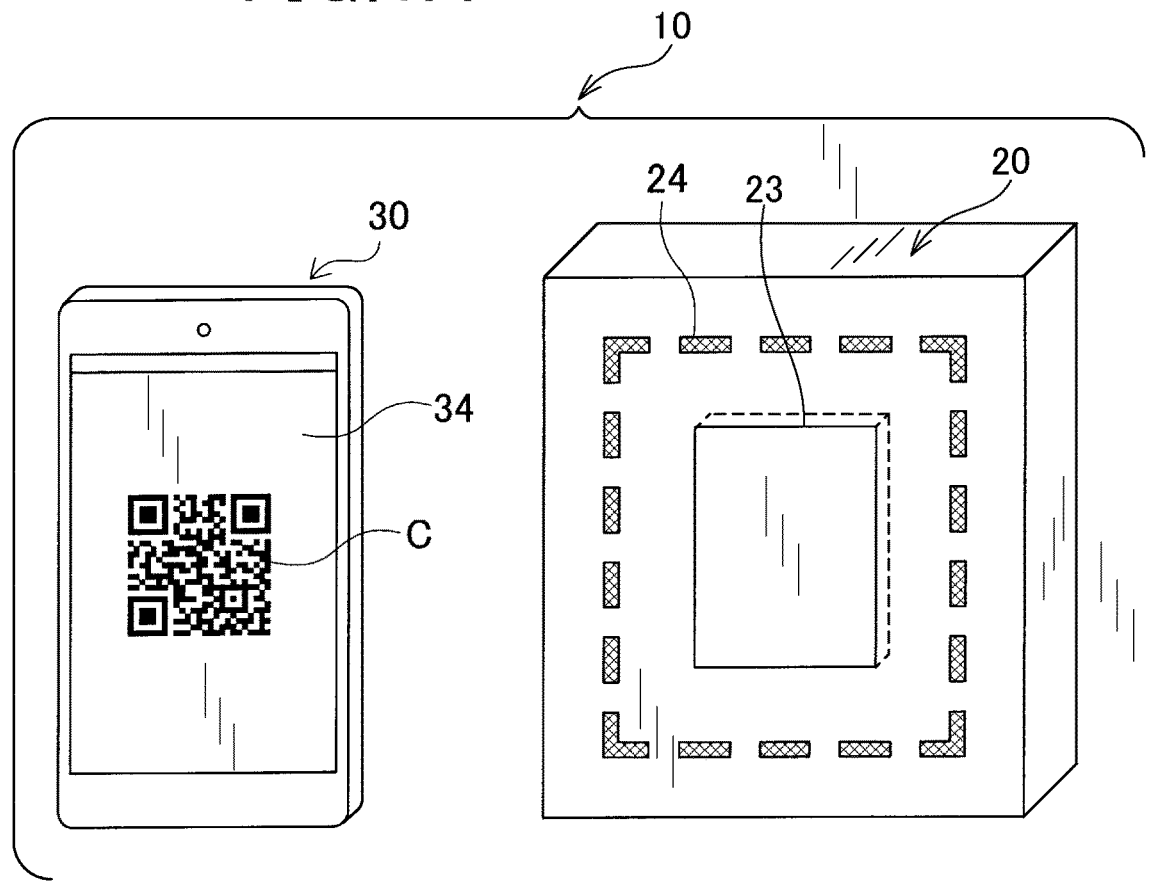
FIG. 1A is a schematic diagram outlining a configuration of an authentication system according to a first embodiment.

FIG. 1A shows the hardware configuration of the authentication system 10, while FIG. 1B describes the state of authentication using the user's mobile terminal, which will be described later.

In the present embodiment, the authentication system 10 is adopted as, for example, an entry/exit management system that manages permission or disapproval when a user who has succeeded in face recognition enters a specific room. The user carries the mobile terminal 30 as an information code recording medium including the authentication code C. The user causes the authentication device 20 installed at the entrance/exit to a specific room to image the authentication code C displayed on the screen of the mobile terminal 30. By performing this imaging operation, when the user is successfully authenticated, entry into the specific room is permitted. Specifically, this permission is executed by transmitting information indicating authentication success from the authentication device 20 to a locking/unlocking control unit 40 that controls the locking/unlocking of the electric lock provided on the door of the doorway. The locking/unlocking control unit 40 responds to this transmission. That is, the control unit 40 controls the electric lock to the unlocked state. As a result, entry into the specific room is permitted.

Figure 2:
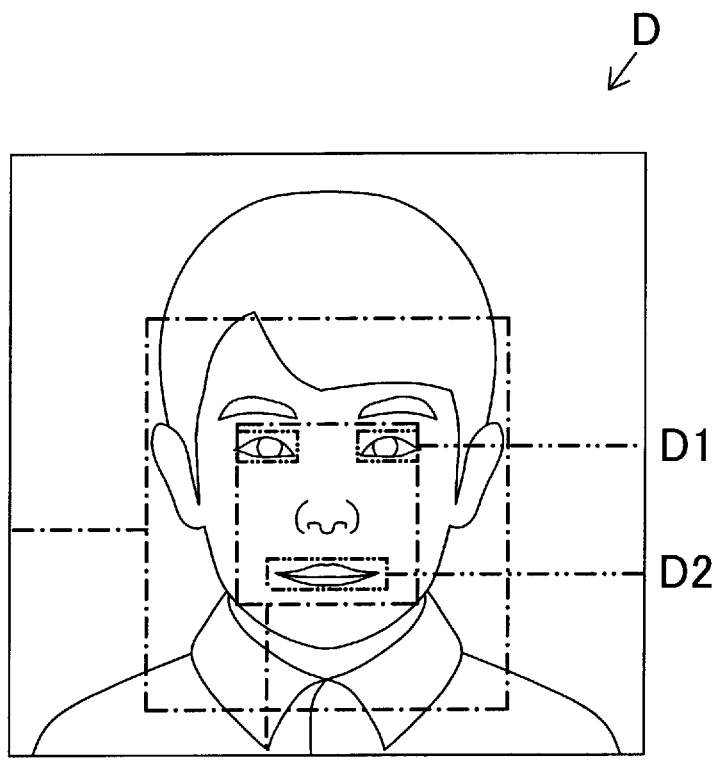
FIG. 2 is an illustration exemplifying extraction of a part of facial feature points from an imaged facial image data.

The authentication code C is generated by a predetermined code generator (not shown). This generator is configured to generate the authentication code C when the facial image data of the user is acquired from the user who applies for personal authentication. When this code generator acquires facial image data from a user, it extracts facial feature points from the data. Further, the code generator encodes the information including the information indicating the facial feature points and the personal information to generate the authentication code C. In the present embodiment, the facial feature points include the size, shape, contour of each of the facial organs such as eyes, eyebrows, nose, ears, and mouth, and the arrangement position of these organs. This code generator performs a facial feature point extraction process for extracting known facial feature points. According to this extraction, for example, as illustrated in FIG. 2, feature points are calculated for each item of acquired facial image data D. For example, data such as "D1: cut eyes" and "D2: a large mouth" are calculated (i.e., extracted) as facial feature points.

Further, the code generator generates the authentication code C that is decryptably encrypted by using information such as information indicating facial feature points and personal information extracted as described above and a decryption key (encryption key). In the present embodiment, as the authentication code C, for example, a QR code (registered trademark) whose security is enhanced by encryption is adopted.

Figure 3:
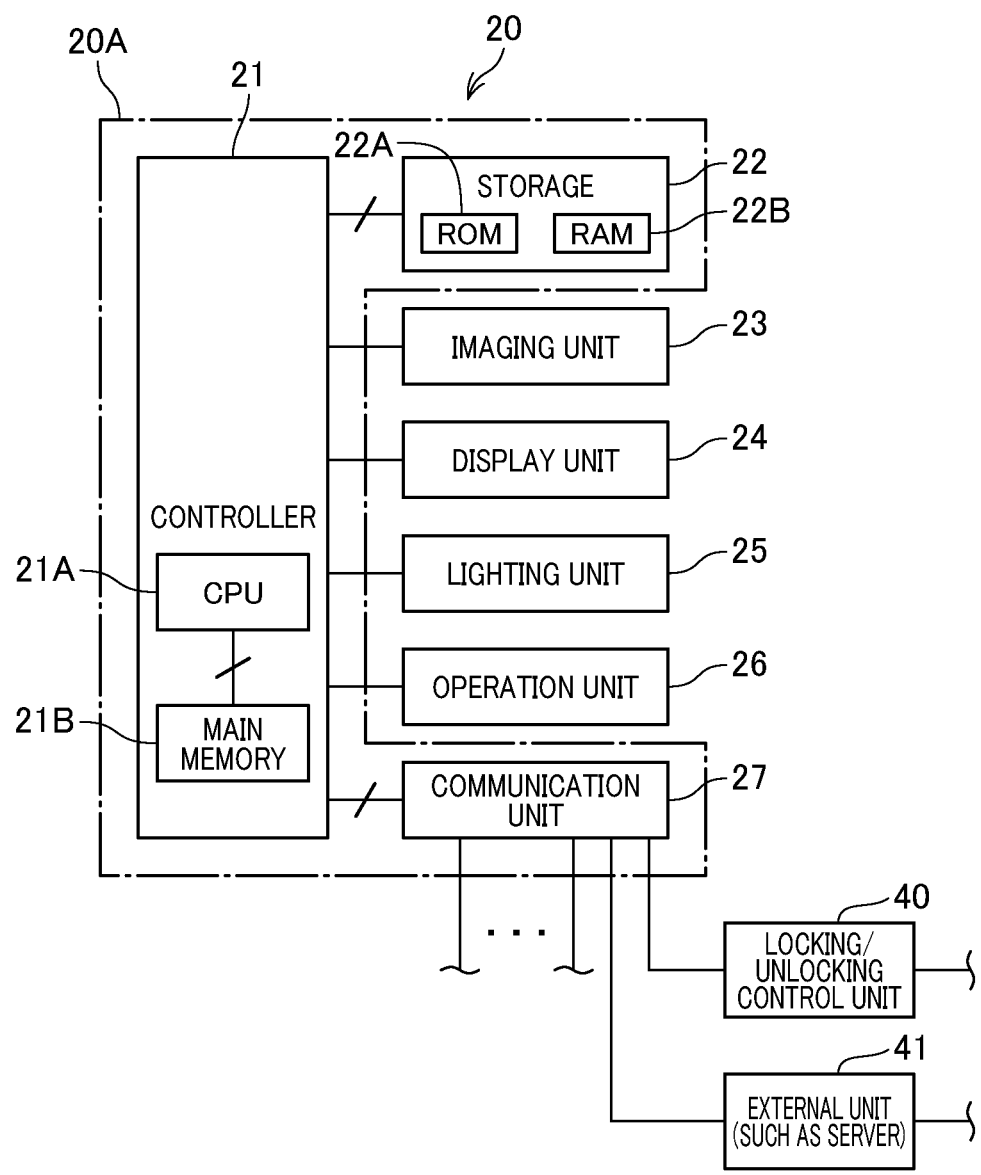
FIG. 3 is a block diagram outlining an electric configuration of an authentic device in the first embodiment.

Next, the authentication device 20 will be described with reference to FIGS. 1A and 1B, and FIG. 3. The authentication device 20 is configured as a device that authenticates a user by using the authentication code C displayed on the screen of the mobile terminal 30. As an example, the authentication device 20 is installed on a wall surface near an entrance/exit to the specific room described above, specifically, a door provided at the entrance/exit. Specifically, the authentication device 20 is installed on the wall surface at a position substantially matching the height of the user's line of sight (see FIG. 1B). As shown in FIG. 3, the authentication device 20 includes a control unit 21, a storage unit 22, an imaging unit 23, a display unit 24, a lighting unit 25, an operation unit 26, a communication unit 27, and the like. Of these, the control unit 21, the storage unit 22, and the communication unit 27 constitute a processor 20A that handles arithmetic and control processing.

The control unit 21 is mainly composed of a computer having a CPU (central processing unit) 21A that plays a central role in calculation and a main memory 21B as a work area. As a result, the control unit is configured to perform authentication processing, various operations, and control of the entire system, which will be described later. The storage unit 22 includes a ROM (read-only memory (EEPROM, etc.) 22A, RAM (random access memory) 22B, and if necessary, a known storage medium such as an HDD (not shown) or a non-volatile memory). The storage unit 22 stores in advance an application program for executing the authentication process, a predetermined database, and the like. The data are stored available by the control unit 21 (ie, CPU 21A). In addition, the storage unit 22 stores in advance a decryption key for decrypting the authentication code C.

In this embodiment, the ROM 22A functions as a non-transitory computer-readable recording medium. The ROM 22A stores the above-mentioned application program and other control/processing program procedures as source code. This non-transitory computer-readable recording medium may be composed of a type of RAM that does not lose stored information.

This program is read and executed by the CPU 21A in the preset work area 21B. The RAM 22B is configured to be able to temporarily store data generated while the CPU 21A is executing the process. Also, the main memory 21B is composed of RAM.

Of course, the configuration of this processor 20A is an example. The processor 20A may have another configuration as long as it can execute a program related to necessary authentication and control. For example, the processor 20A may be provided with a plurality of CPUs to perform distributed control, or may have a configuration in which a redundant system is formed. The CPU 21A is an element that plays a central role in the calculation of a computer system. Of course, the CPU 21A may have a different name (for example, an arithmetic unit, a processor, a microprocessor) as long as it has the same function.

The imaging unit 23 is configured as a camera including a light receiving sensor (for example, a C-MOS area sensor, a CCD area sensor, etc.). The imaging unit 23 is configured so that the data of the image captured through the reading window (imaging window) is output to the control unit 21. The control unit 21 functions as an extraction unit based on the facial image data captured by the imaging unit 23. With this function, the facial feature point extraction process is performed in the same manner as the code generator described above. Facial feature points are extracted by this extraction process. Further, the control unit 21 functions as a reading unit based on the authentication code C imaged by the imaging unit 23. With this function, the information code reading process (decoding process) is performed using the decoding key stored in the storage unit 22. That is, the encrypted authentication code C is decrypted based on the decryption key. As a result, the facial feature points recorded in the authentication code C are read.

The display unit 24 is composed of, for example, an LED. As shown in FIG. 1A, the display unit 24 is arranged in a substantially square ring shape so as to surround the reading window of the imaging unit 23. The display unit 24 is configured to change its lighting/blinking state according to the success/failure of extraction of facial feature points, the result of authentication processing, etc., in response to the control from the control unit 21. Due to such an arrangement configuration, the imaging unit 23 is located within the user's field of view as long as the user is looking at the display unit 24.

The lighting unit 25 includes an illumination light source, a lighting lens, and other necessary elements, the operation of which is controlled by the control unit 21. The lighting unit 25 is configured to irradiate the illumination light toward the imaging range of the imaging unit 23. The operation unit 26 has a configuration in which, for example, an operation signal corresponding to a user's input operation is output to the control unit 21. Therefore, the control unit 21 receives the operation signal and performs processing according to the input operation from the user. The communication unit 27 functions as a communication interface for performing data communication between the locking/unlocking control unit 40 and the external unit 41 such as a server for entry/exit management. The communication unit 27 performs communication processing in cooperation with the control unit 21.

Figure 4:
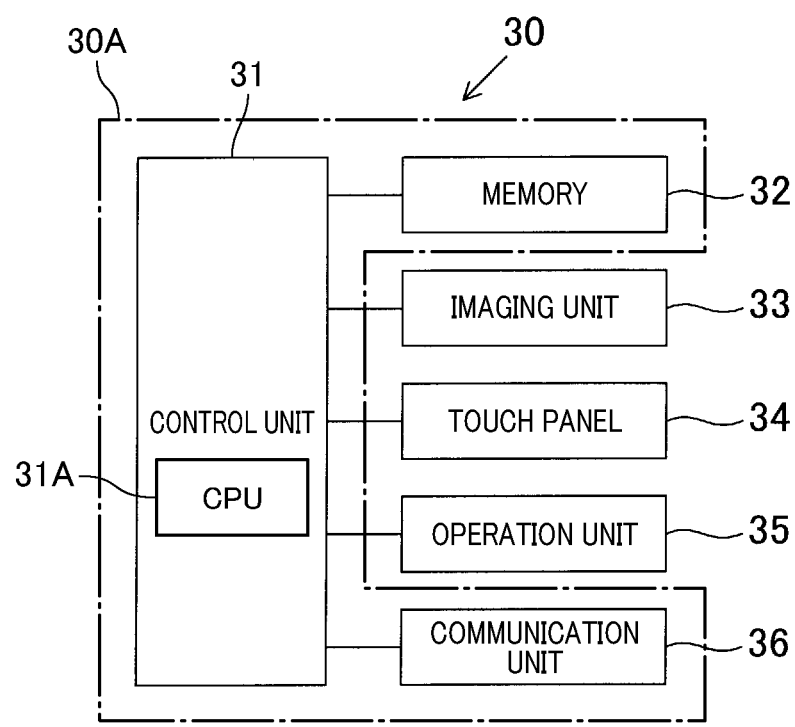
FIG. 4 is a block diagram outlining an electric configuration of a mobile terminal carried by a user.

Next, the mobile terminal 30 will be described with reference to FIGS. 1A and 4. The mobile terminal 30 shown in FIGS. 1A and 4 is, for example, a smartphone owned by the user. The mobile terminal 30 includes a control unit 31 including a CPU 31A, a memory 32, an imaging unit 33 configured as a camera, and a touch control 34 whose display contents are controlled by the control unit 31. Further, the mobile terminal 30 includes an operation unit 35 that outputs a signal corresponding to the user's touch operations and/or key operations to the touch control 34 to the control unit 31, and a communication unit 36 for communicating with an external device and other necessary devices.

A memory 32 of the mobile terminal 30 configured in this way is provided. The authentication code C generated by the code generator described above is stored in the memory 32 in advance. The control unit 31 (CPU 31A) displays the authentication code C read from the memory 32 on the screen of the touch control 34 in response to the user's operation on the operation unit 35 (see FIG. 1A).

Figure 5:
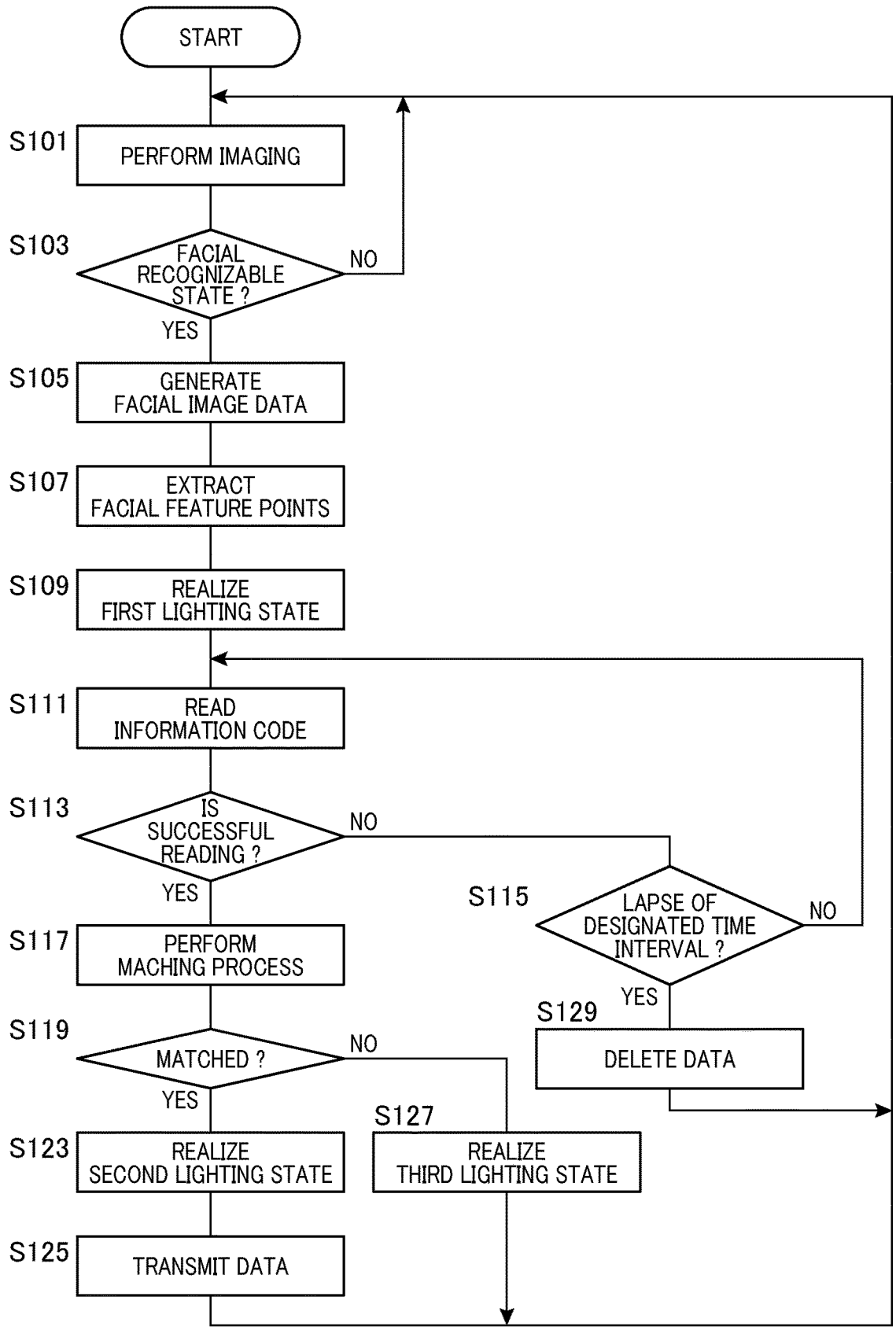
FIG. 5 is a flowchart exemplifying a flow of an authentication process executed by the authentication device.

Next, the authentication process (corresponding to the authentication method) executed by the authentication device 20 will be described in detail with reference to the flowchart shown in FIG. 5.

The control unit 21 of the authentication device 20 starts the authentication process. In response to this start, the imaging process shown in step S101 of FIG. 5 is performed. In this process, the lighting unit 25 irradiated the illumination light through the reading window. In this irradiation state, imaging is performed by the imaging unit 23. Subsequently, in the determination process of step S103, it is determined whether or not the human face is recognizable by the imaging unit 23 (hereinafter, also referred to as a facial recognizable state). As a result, when it is determined that the human face is not imaged and is not in the facial recognizable state (No in S103), the imaging by the imaging unit 23 is further continued. The imaging process corresponds to an example of an "imaging step" in which an imaging image is generated by the imaging unit 23. Further, the determination process in step S103 corresponds to an example of the "determination step", and the control unit 21 that executes this determination process functionally corresponds to an example of the "determination unit".

Figure 1B:
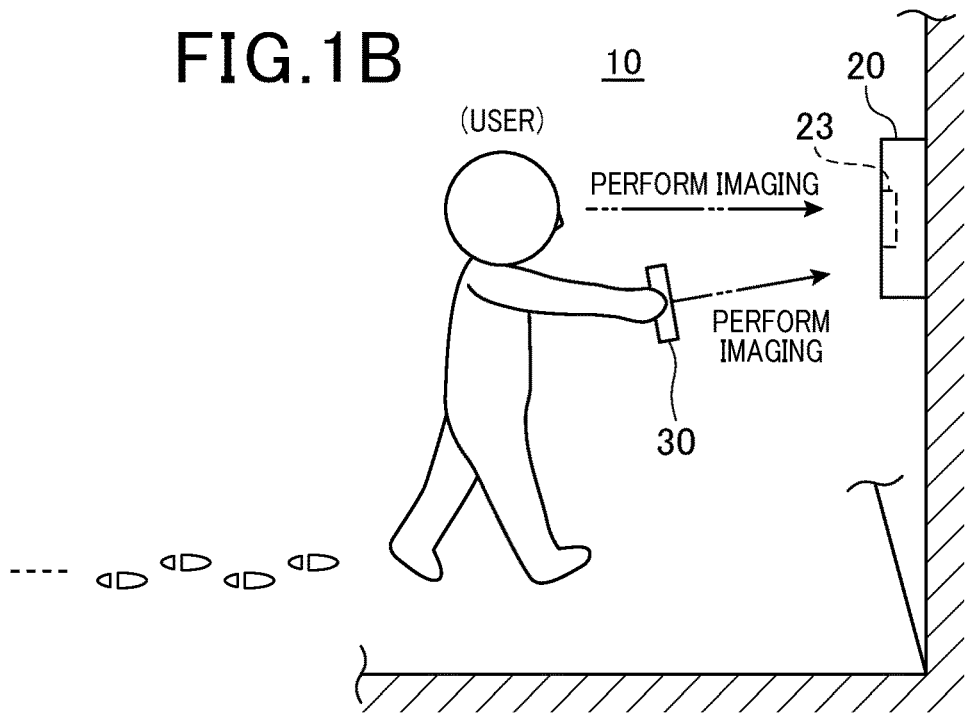
FIG. 1B is an outlined illustration explaining how to use the authentication system according to a first embodiment.

The user who enters the specific room tries to hold the authentication code C displayed on the screen of the mobile terminal 30 over the reading window of the authentication device 20 (see FIG. 1B). At that time, the face of the user who sees the reading window is imaged by the imaging unit 23. As a result, when the authentication device 20 is in the facial recognizable state, it is determined as Yes in step S103. Next, the facial image data generation process shown in step S105 is performed. In this process, the imaging unit 23 newly captures an image for extracting facial feature points and generates facial image data.

In the facial image data generation process, a plurality of images for extracting facial feature points are newly consecutively imaged, and from the data of those images, one image data from which facial feature points can be easily extracted may be determined, and the image data may be set as facial image data.

Subsequently, the facial feature point extraction process shown in step S107 is performed. In this extraction process, facial feature points are extracted from the facial image data generated as described above, as in the extraction process of the code generator described above. The facial feature points extracted in this way are temporarily stored in the storage unit 22. The facial feature point extraction process functionally corresponds to an example of an "extraction step".

When the facial feature points are extracted in this way, the authentication device 20 indicates that the extraction of the facial feature points is completed and the authentication code C is readable. Specifically, the display unit 24 is controlled to the first lighting state (for example, the blue lighting state) (S109). Subsequently, the information code reading process shown in step S111 is performed. In this reading process, the decoding process for reading the information code imaged by the imaging unit 23 is performed using the decoding key stored in the storage unit 22. The information code reading process functionally corresponds to an example of a "reading step".

Next, in the determination process of step S113, it is determined whether or not the authentication code C has been successfully read. Here, if the authentication code C is not imaged or an information code different from the authentication code C is read, it is determined as No in step S113. Therefore, if a certain time has not passed since the first lighting state (No in S115), the information code reading process in step S111 is performed, and the state in which the information code can be read is maintained.

Then, in a state where a certain time has not passed since the first lighting state (No in S115), it is assumed that the user whose facial image is captured as described above holds the authentication code C displayed on the screen of the mobile terminal 30 over the reading window of the authentication device 20. In response to this holding, the authentication code C is imaged. When the information about facial feature points and personal information are successfully read by this imaging (Yes in S113), the matching process shown in step S117 is performed. In this process, based on the facial feature points extracted from the facial image data and the facial feature points read from the authentication code C, it is collated whether or not both feature points match for all the items indicating each facial feature points. The matching process functionally corresponds to an example of a "matching step (or collating step)". The control unit 21 that executes this matching process functionally corresponds to an example of a "matching unit (or collating unit)".

Then, when all the feature items of facial feature points are matched, it is determined as Yes in the determination process of step S119. As a result, the display unit 24 is controlled to the second lighting state (for example, the green lighting state) for a certain period of time to indicate that the authentication is successful (S123). Subsequently, the transmission process shown in step S125 is performed. As a result, information indicating authentication success (authentication success information) is transmitted to the locking/unlocking control unit 40 via the communication unit 27. At the same time, necessary information including authentication success information and read personal information is transmitted to an entry/exit management server 41 (external unit) or the like via the communication unit 27. Then, the above-mentioned steps S101 and subsequent processes are performed, and the face of the next user who wishes to enter the room can be imaged.

In the determination process of step S119, the determination is not limited to Yes when all the feature items of facial feature points are matched. For example, if a predetermined number of feature items among facial feature points is matched, it may be set to be determined as Yes. Here, the determination process in step S119 functionally corresponds to an example of the "authentication step", and the control unit 21 that executes this determination process functionally corresponds to an example of the "authentication unit".

As described above, the authentication success information is transmitted from the authentication device 20. Upon receiving this authentication success information, the locking/unlocking control unit 40 controls the electric lock to the unlocked state. As a result, the user can enter the specific room.

On the other hand, it is assumed that a third party holds the authentication code C displayed on the screen of another person's mobile terminal 30 over the reading window of the authentication device 20. In this case, since each item of facial feature points is not be matched, it is determined as No in step S119. As a result, the display unit 24 is controlled to the third lighting state (for example, the red lighting state) for a certain period of time to indicate that the authentication has failed (S127). In this case, the authentication success information is not transmitted from the authentication device 20. Therefore, the electric lock is not unlocked by the locking/unlocking control unit 40.

In such a case, the authentication failure information, the read personal information, and the like may be set to be transmitted to the entry/exit management server 41 or the like via the communication unit 27.

Further, when a certain time has elapsed from the first lighting state in the state where the authentication code C has not been imaged, it is determined to be Yes in step S115. In this case, the facial feature points extracted and stored as described above are deleted from the storage unit 22. After that, the process is returned to step S101, and the step described above is executed again.

As described above, the authentication system 10 according to the present embodiment includes a mobile terminal 30. In this mobile terminal 30, the authentication code C in which the facial feature points extracted from the facial image of the user is recorded is stored in the memory 32 so that the screen can be displayed. In this authentication device 20, after the facial recognizable state is determined, facial feature points are extracted from the captured image of the human face captured by the imaging unit 23. At the same time, information on facial feature points recorded in the authentication code C is read from the image of the authentication code C displayed on the screen of the mobile terminal 30 captured by the imaging unit 23. Next, the extracted facial feature points are collated with the read facial feature points. The user is authenticated based on this collation result. That is, it is confirmed that the user who brings the mobile terminal 30 and holds the display screen of the mobile terminal 30 on the authentication device 20 is an authorized user who can be permitted to enter the room.

As a result, the user only has to make the imaging unit 23 of the authentication device 20 take an image of his/her face and the authentication code C displayed on the screen of his/her mobile terminal 30. By this operation, authentication using facial feature points can be performed. In particular, the imaging unit 23 for imaging the user's face and the imaging means for imaging the authentication code C displayed on the screen of the mobile terminal 30 are shared. Therefore, the user only has to hold the authentication code C over the reading window while looking at the reading window of the imaging unit 23. In this case, before the authentication code C is imaged, the face of the user who is holding the authentication code C can be recognizable by the imaging unit 23 without the user being particularly conscious of it. Further, in order to image the user's face, it is not necessary for the user to perform a special operation such as standing still with respect to the imaging unit 23. Therefore, before reading the authentication code C, the user's face can be imaged and the process for extracting the facial feature points can be started. Since this process is started in advance, the calculation time from holding the authentication code C over or above the imaging unit 23 to obtaining the matching result of the matching process is shortened. As a result, the authentication time that the user consciously waits for can be shortened.

In particular, the facial feature points extracted by the above facial feature point extraction process are held in the storage unit 22 until a certain period of time has elapsed from the first lighting state (until it is determined to be Yes in S115). Such extracted facial feature points are then erased from the storage unit 22. For example, the authentication code C may not be read because the method of holding the authentication code C displayed on the screen on the mobile terminal 30 is not appropriate. However, even in such a case, the extracted facial feature points are retained for a certain period of time. Therefore, if the authentication code C is properly read within this fixed time, it is not necessary to re-recognize the user's face. Accordingly, the time and effort of the user can be saved. On the other hand, the extracted facial feature points are erased from the memory after a certain period of time (Yes in S115). As a result, even if the face of another person different from the authentication target is unintentionally imaged, it can be appropriately erased.

The first modification of this embodiment can be developed as follows. The display unit 24 is controlled by the control unit 21, and the determination of No may be repeated in step S103. During this repetition, that is, before the facial recognizable state is established, the display unit 24 may be made to execute a predetermined display state (for example, a blue blinking state) different from the first to third lighting states described above in order to indicate that the authentication code C is in a readable state. That is, the display unit 24 may be provided to indicate the state in which the authentication code C can be read in the above-mentioned predetermined display state. In the case of this modification as well, the imaging unit 23 is arranged at a position within the visual field range of the user who is viewing the display unit 24.

As a result, when the user tries to hold the authentication code C over the imaging unit 23, the user can visually recognize that the display unit 24 is in the above-mentioned predetermined display state. The imaging unit 23 located within the user's field of view enables the user's face to be imaged in a more recognizable state. Hence, the authentication accuracy can be improved. The first to third lighting states and the above-mentioned predetermined display states are examples, various other display targets may be adopted, such as changing the color and/or changing the blinking at predetermined intervals and the display location of lighting/blinking. Also, when controlling the first to third lighting states or the above-mentioned predetermined display state, a voice or the like may be used to notify the fact.

The following examples will be given as a second modification of the present embodiment. The control unit 21 controls lighting unit 25 so that the lighting state when imaging a human face with imaging unit 23 and the lighting state when imaging an authentication code C with imaging unit 23 are different according to a predetermined condition. For example, when the lighting unit 25 is configured to be capable of irradiating infrared light in addition to visible light, it irradiates infrared light when imaging a human face under predetermined conditions such as at night when the surroundings are dark. Further, when the authentication code C is imaged, visible light adjusted so as to suppress the brightness may be irradiated. Irradiating bright visible light in a dark environment may make the user feel dazzling. On the other hand, when the authentication code C is imaged with the infrared light, the image may not be readable depending on the type of the information code recording medium displaying the authentication code C. Therefore, visible light and infrared light are used properly selectively.

That is, even when the same imaging unit 23 is used, it is possible to switch between an imaging state (lighting state) suitable for imaging a human face and an imaging state (lighting state) suitable for imaging the authentication code C according to a predetermined condition such as ambient brightness. This improves the extraction accuracy of facial feature points and the reading accuracy of the authentication code C. As a result, the authentication accuracy can be improved.

In addition, in order to further enhance the confidentiality of the information regarding facial feature points, a partially private code can be adopted as the authentication code C. This partially private code has a public area and a private area in which information decryptably encrypted using a decryption key is recorded. Therefore, information about facial feature points is recorded in the private area. As a result, the code reader who does not have the decryption key can read only the information recorded in the public area, and cannot even recognize that the information is recorded in the area other than the public area. Hence, the confidentiality of information regarding facial feature points can be enhanced. On the other hand, the authentication system 10 may be used in an environment where the demand for security is relatively low. In that case, the authentication code C may be generated without encryption based on the information about the facial feature points extracted as described above.

Second Embodiment

Next, an authentication system, an authentication device, and an authentication method according to a second embodiment will now be described with reference to the drawings.

The second embodiment is mainly different from the first embodiment in that the determination conditions for determining the facial recognizable state are made more rigorous. Therefore, the same components as those of the first embodiment are designated by the same reference numerals, and the description thereof will be omitted.

As described above, the control unit 21 functioning as the determination unit performs the determination process in step S103 as a part of the authentication process. In this determination process, it is determined whether or not the human face is recognizable by the imaging unit 23 (that is, the facial recognizable state is established or not).

By the way, it is assumed that a third party may have the imaging unit 23 take an image of a face photograph or the like displayed on the screen of the mobile terminal for an illegal purpose. In the case of such unauthorized use, it may be erroneously determined to be in a facial recognizable state. In particular, the system according to the present disclosure authenticates by reading an information code such as an authentication code C displayed on the screen of the mobile terminal. For this reason, it is necessary to easily assume unauthorized use of displaying an illegal face photo or the like on the screen of the mobile terminal.

In order to prevent the foregoing possible difficulty, in the present embodiment, the determination conditions for determining that the facial recognizable state has been established are set more strictly. As a result, even if the face photograph is taken by the imaging unit 23 for an illegal purpose, it is prevented from being erroneously determined to be in the facial recognizable state. Therefore, it reduces or prevents spoofing that pretends to be a legitimate authorized person (authorized user) and performs an act permitted only by the authorized person.

Specifically, in the determination process of step S103, images consecutively captured at regular intervals by the imaging unit 23 are used. This set of successive images are used to check that the recognizable image of the person's face gradually grows. When the face gradually grows in size, it is determined to be in a facial recognizable state.

Figure 6:
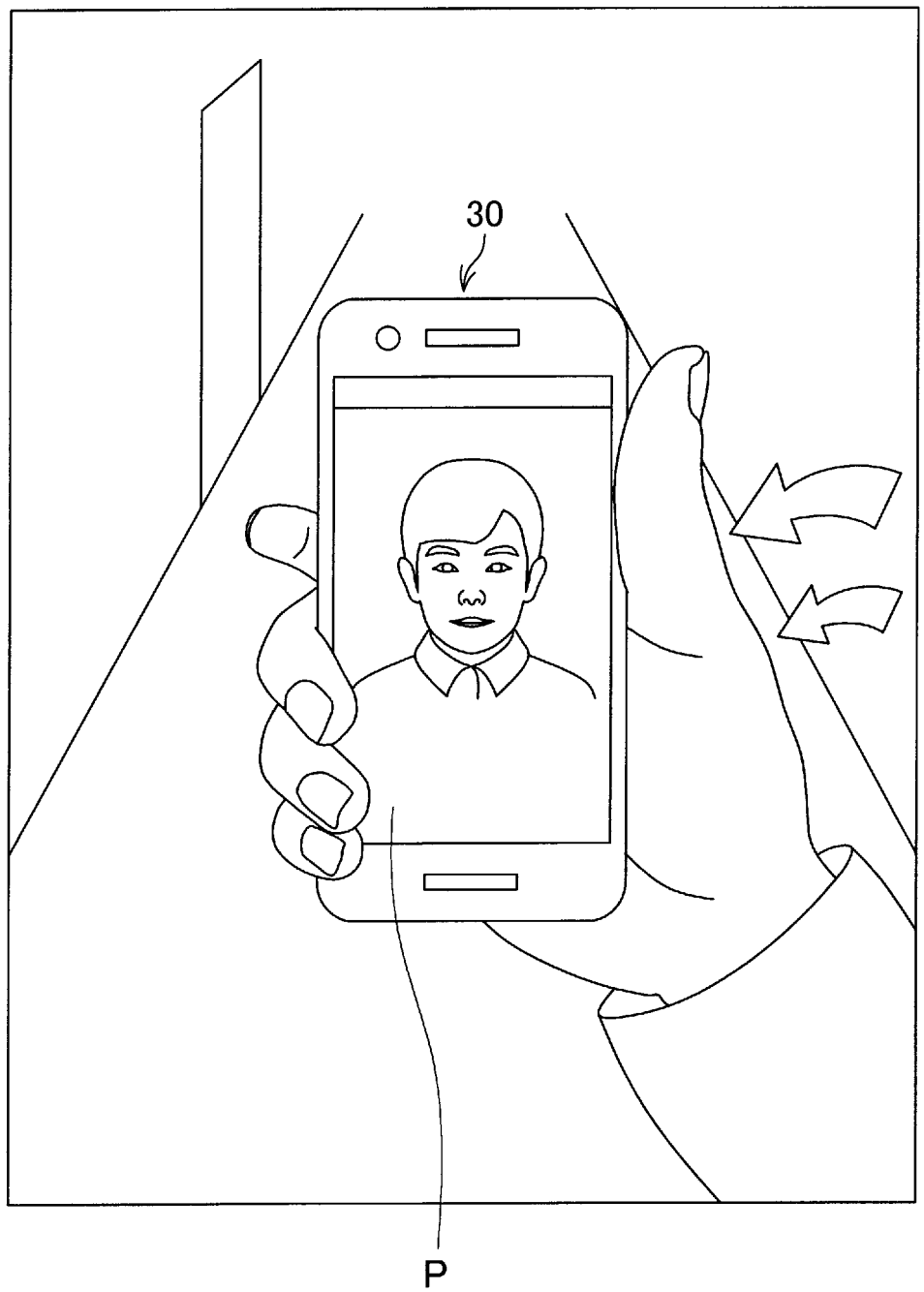
FIG. 6 is an illustration explaining a state where a user's facial picture displayed on the screen of the mobile terminal has been imaged by an imaging unit of the authentication device.

Therefore, when the legitimate authority approaches the imaging unit 23 in an attempt to enter the specific room, the face of the legitimate authority is recognized, and then the face is imaged so as to gradually increase in size. Therefore, it is determined that the facial recognizable state has been established. On the other hand, as illustrated in FIG. 6, it is assumed that a third party has the imaging unit 23 take an image of an illegal facial photograph P displayed on the screen of the mobile terminal. In this case, even if it is recognized as a human face, it is not determined that the facial recognizable state has been established unless the person's face gradually becomes larger thereafter.

As described above, in the present embodiment, a plurality of images consecutively taken by the imaging unit 23 at regular intervals are checked. It is determined that a facial recognizable state has been established when the face of a person imaged recognizably becomes larger. However, when a facial photograph is taken for an illegal purpose, the false judgment that the facial recognizable state has been established is almost reduced. Therefore, spoofing can be prevented more effectively.

A first modification of the present embodiment will be described. This first modification relates to the determination process of step S103. In this step 103, the reference line Lo in the captured image of the imaging unit 23 is set. It is determined whether or not the inclination of the center line Lf for the human face imaged recognizably with respect to the reference line Lo is within a predetermined angular range. If the inclination is within a predetermined angular range, it is determined to be in a facial recognizable state.

Figure 7:
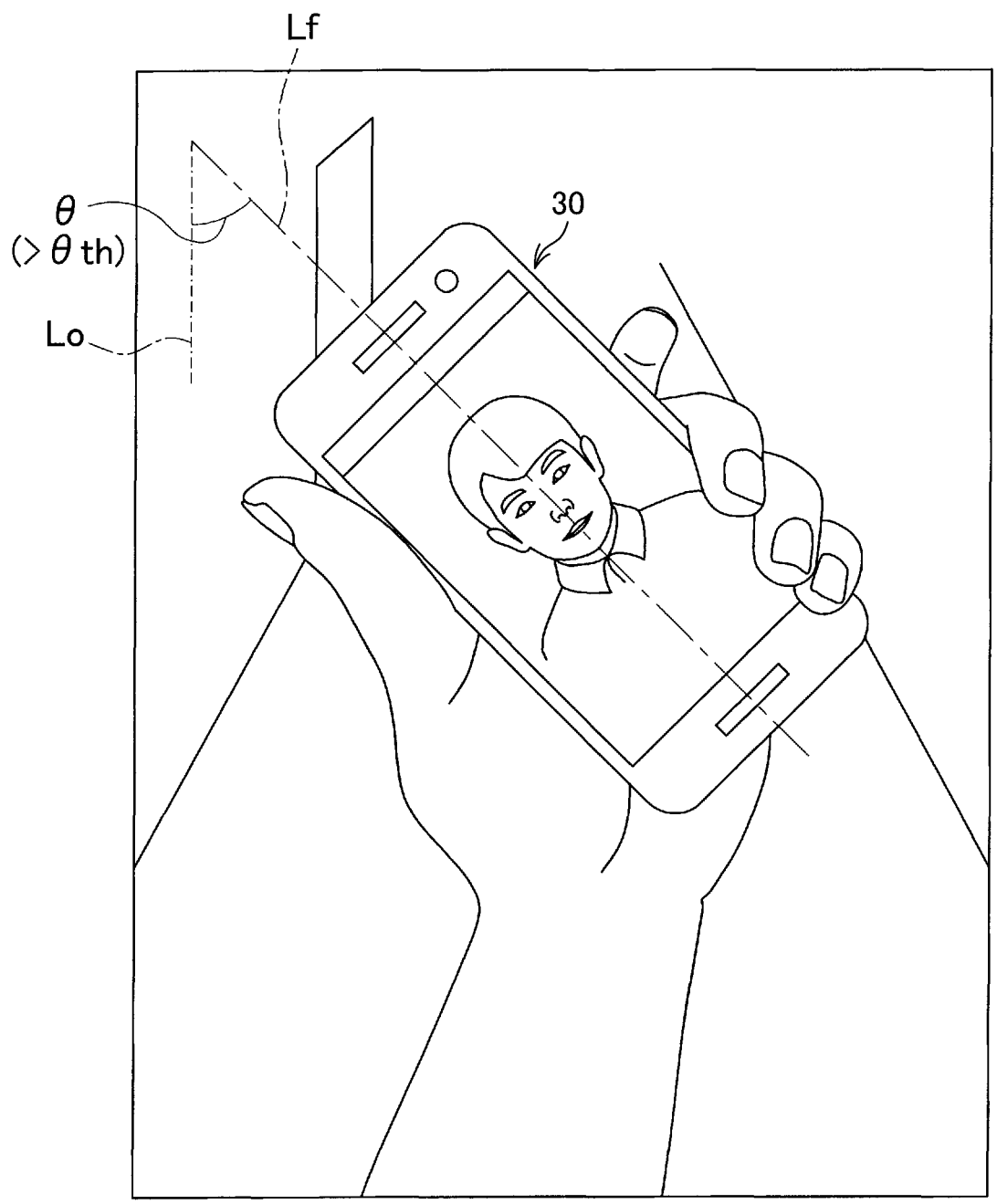
FIG. 7 is an illustration explaining a state where a user's facial picture displayed on the screen of the mobile terminal has been imaged in a tilted attitude by an imaging unit of the authentication device.

This first modification will be specifically described. The reference line Lo is set to be a vertical straight line (a line along the direction of gravity). A third party causes the imaging unit 23 to take an image of a face photograph or the like displayed on the screen of the mobile terminal. At this time, for example, as illustrated in FIG. 7, the facial photograph may be tilted. With this inclination, in the captured image, the center line Lf with respect to the face is inclined with respect to the reference line Lo (vertical line). On the other hand, when a person walking toward the imaging unit 23 is imaged, the inclination of the center line Lf for the face in the captured image with respect to the reference line Lo becomes sufficiently small. That is, in the captured image of the imaging unit 23, when the inclination θ of the center line Lf with respect to the reference line Lo is not within a predetermined angular range θth (for example, 30°), the imaging unit 23 is capturing a facial photograph. It can be judged that the possibility is higher.

Hence, in the first modification, the inclination θ of the center line Lf with respect to the reference line Lo in a recognizable image of a human face is determined. When this inclination θ is within a predetermined angular range θth, it is determined to be a facial recognizable state. On the other hand, when this inclination θ is not within the predetermined angular range θth, it is determined not to be a facial recognizable state. As a result, even if a facial photograph is taken for an illegal purpose, it is avoidable, as much as possible, to erroneously determine that the facial photograph is in a facial recognizable state if the facial photograph is greatly inclined. Therefore, spoofing can be prevented.

Further, as a second modification of the present embodiment, the determination process in step S103 can be transformed into another embodiment. Specifically, in step S103, based on the consecutive image output from the imaging unit 23, it is possible to recognize whether or not the recognizable image of the person's face is blinking. If it is recognized that it is blinking, it may be determined that it is in a facial recognizable state. When a third party captures a face photo or the like displayed on the screen of the mobile terminal on the imaging unit, even if it is recognized as a human face, there is no blinking. Therefore, the determination process in step S103 does not determine that the facial recognizable state is present. Therefore, even if a facial photograph is taken for an illegal purpose, it is not erroneously determined to be in a facial recognizable state. Therefore, spoofing can be prevented.

Further, as a third modification of the present embodiment, another aspect of the determination process in step S103 will be described. For example, in step S103, using the consecutive image output from the imaging unit 23, it is determined whether or not the range of the shadow on the human face that is recognizably imaged changes. When it is determined that the range of this shadow changes, it can be determined that the facial recognizable state is present in the determination process of step S103.

Figure 8:
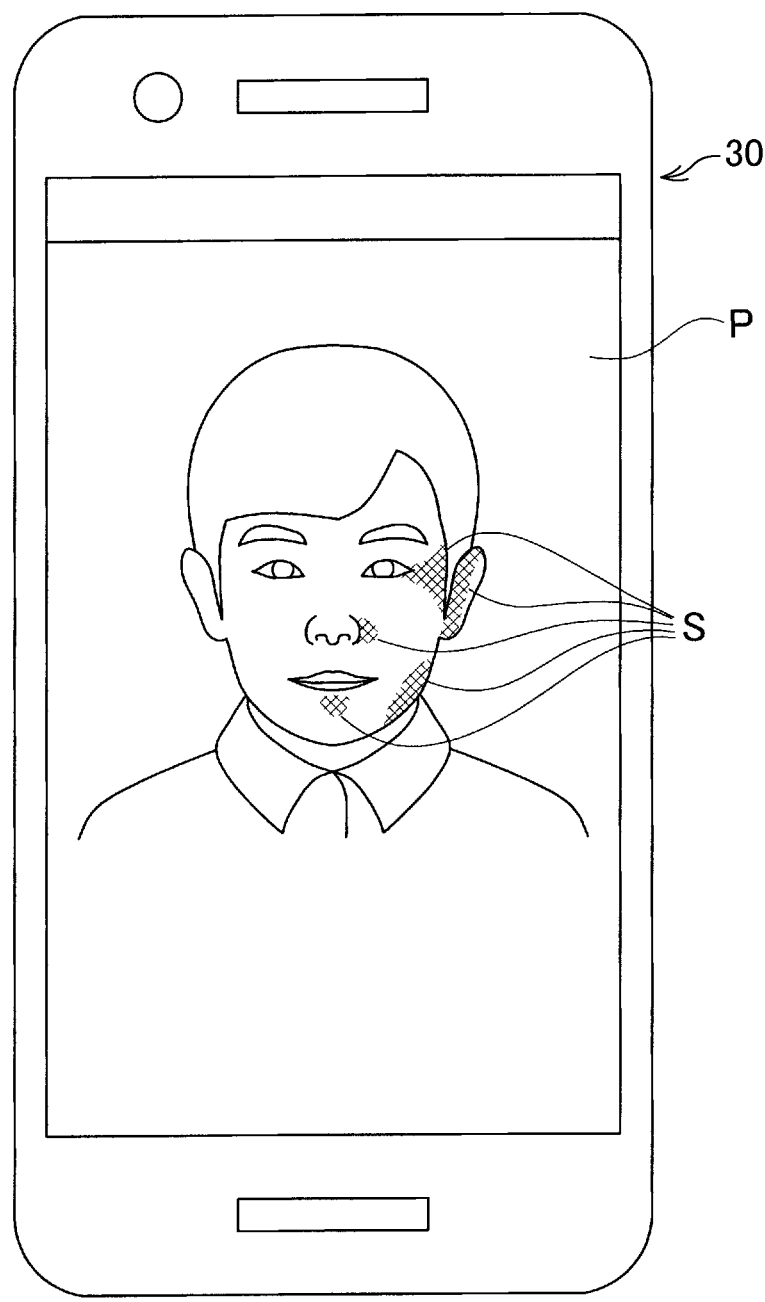
FIG. 8 is an illustration explaining a state where a user's facial picture is displayed on the screen, with a shadow put partly on the user's face.

For example, as illustrated in FIG. 8, in the case of a facial photograph P in which a human face is imaged, a shadow is cast on a part of the face (see the hatching area S in FIG. 8) depending on the brightness of the environment at the time of imaging capture. Therefore, when the person to be imaged moves, the way the light hits the person's face changes. Therefore, the size and position of the shadow portion range change. However, in the case of imaging the face photograph P, even if the face is shaded, the range of the shadow does not change. That is, if the range of the shadow on the human face does not change in the consecutive image, it is highly possible that the imaging unit 23 has captured the face photograph.

Therefore, in images consecutively captured by the imaging unit 23, when the range of the shadow on the human face captured recognizably changes, it is determined to be the facial recognizable state. As a result, when a face photograph or the like is imaged by the imaging unit 23, the face photograph is recognized as a human face. However, in the case of a facial photograph, the range of shadows on the face does not change. Therefore, it is not determined to be in the facial recognizable state by the determination process in step S103. Therefore, even if a facial photograph is taken for an illegal purpose, it is not erroneously determined to be in a facial recognizable state, so that spoofing can be prevented.

Further, as a fourth modification of the present embodiment, it is possible to provide still another aspect of the determination process in step S103. In step S103, it is determined whether or not the depth of the human face recognizable by the imaging unit 23 is recognized. When this depth is determined, it may be determined that it is a facial recognizable state. Hence, when a third party captures a face photograph or the like displayed on the screen of the mobile terminal on the imaging unit, it is recognized as a human face. However, in that case, the depth in the person's face is not recognized. It is therefore not determined to be in the facial recognizable state by the determination process in step S103. Therefore, even if a facial photograph is taken for an illegal purpose, it is not erroneously determined to be in a facial recognizable state. Therefore, spoofing can be prevented.

The present disclosure based on the present invention is not limited to the above embodiments and modifications, and may be embodied as follows:

(1) The authentication code C is not limited to being stored in the memory 32 so that the touch control 34 of the mobile terminal 30 can be displayed on the screen. This authentication code may be printed on one side of an information code recording medium such as a paper medium so that the image can be captured.

(2) The authentication system 10 according to the present disclosure based on the present invention is not limited to being applied to an entrance/exit management system that allows entry into a specific room. This authentication system 10 may be adopted, for example, in a management system that manages an entrance gate of a concert hall. Further, the authentication system 10 may be adopted in a system used when providing a service that requires authentication at a retail store or the like.

(3) In the authentication process executed by the control unit 21 of the authentication device 20, the process for reading the authentication code C is started after the facial feature points are extracted, but the present disclosure is not necessarily limited to this mode. For example, the authentication code C may be read before the facial recognizable state is obtained. Specifically, if the authentication code C is read before the facial recognizable state is reached, the facial recognizable state is reached thereafter. In this case, facial feature points are extracted from the facial image data captured after the facial recognizable state. The matching (collation) process can be performed based on the extracted facial feature points and the facial feature points previously read from the authentication code C.

(4) The authentication process executed by the control unit 21 of the authentication device 20 can also be modified as follows. Specifically, as described above, the matching process is not limited to the mode of performing the matching process based on the facial feature points extracted from the captured facial image data and the facial feature points read from the authentication code C. Information such as captured facial image data or extracted facial feature points, captured image data of authentication code C or read facial feature points can be transmitted to a server or the like. That is, the matching process may be performed on the server or the like, and the matching result or the like may be obtained on the terminal side.

PARTIAL REFERENCE SIGNS LIST

10 . . . authentication system
20 . . . authentication device
21 . . . control unit (determination unit, extraction unit, reading unit, matching unit, authentication unit)
22 . . . storage unit
23 . . . imaging unit
24 . . . display unit
25 . . . lighting unit 30 . . . mobile terminal (information code recording medium)

C . . . authentication code (information code)

What is claimed is:

1. An authentication system, comprising:
an information code recording medium provided with a display and carried by a user; and
an authentication device for authenticating the user that approaches the authentication device,
wherein
the information code recording medium in which an information code is recorded decryptably, first facial feature points of the user being extracted from a facial image of the user and being recorded previously in the information code; and
the authentication device comprises
an imaging unit configured to optically image both a face of the user and the information code displayed on the display of the information code recording medium held by the user over the imaging unit;
a determination unit configured to determine whether or not a state is realized in which the imaging unit recognizes, from an image imaged by the imaging unit, that the imaging unit has imaged the face of the user;
an extraction unit configured to extract second facial feature points from an image of the user's face which has been imaged by the imaging unit, when the determination unit has determined that the state is realized;
a reading unit configured to decode an image of the information code displayed on the display and imaged by the imaging unit such that the first facial feature points recorded in the information code are read, when the determination unit has determined that the state is realized;
a matching unit configured to perform matching between the first facial feature points and the second facial feature points; and
an authentication unit configured to authenticate the user based on matching results performed by the matching unit.

2. An authentication device for authenticating a user, the user holding an information code recording medium provided with a display and approaching to the authentication device, the information code recording medium decryptably recording therein an information code, the information code being allowed to be displayed on the display, the authentication device comprising:
an imaging unit configured to optically image both a face of the user and the information code displayed on the display of the information code recording medium held by the user over the imaging unit, first facial feature points extracted from a facial image of the user being recorded previously in the information code; and
a control unit provided with a computer programmed to:
determine whether or not a state is realized in which the imaging unit recognized, from an image imaged by the imaging unit, that the imaging unit has imaged the face of the user;
extract second facial feature points from an image of the user's face which has been imaged by the imaging unit, when the determination unit has determined that the state is realized;
read the first facial feature points recorded in the information code by decoding an image of the information code displayed on the display and imaged by the imaging unit, when it is determined that the state is realized;
perform matching between the first facial feature points and the second facial feature points; and
authenticate the user based on matching results performed by the matching.

3. An authentication method for authenticating a user who holds an information code recording medium provided with a display, the information code recording medium decryptably recording therein an information code, the information code being allowed to be displayed on the display, first facial feature points extracted from a facial image of the user being recorded previously in the information code, the authentication method comprising:
an imaging step making an imaging unit optically image both a face of the user who approaches the imaging unit for authentication and the information code displayed on the display of the information code recording medium held by the user over the imaging unit;
a determination step determining whether or not a state is realized in which the imaging unit recognized, from an image imaged by the imaging unit, that the imaging unit has imaged the face of the user;
an extraction step extracting second facial feature points from an image of the user's face which has been imaged in the imaging step, when the determination step has determined that the state is realized;
a reading step decoding an image of the information code displayed on the display and imaged by the imaging unit such that the first facial feature points recorded in the information code are read, when the determination unit has determined that the state is realized;
a matching step performing matching between the first facial feature points and the second facial feature points; and
an authentication step authenticating the user based on matching results performed in the matching step.

4. A non-transitory computer readable recording medium in which a program for authenticating a user is readably recorded in advance so as to enable a computer to read the program, the user holding an information code recording medium provided with a display, the information code recording medium decryptably recording therein an information code, the information code being allowed to be displayed on the display of the information code recording medium held by the user over the imaging unit, the computer read the program from the recording medium being entitled to execute the program to provide functionality steps of:
an imaging step making an imaging unit optically image both a face of the user who approaches the imaging unit for authentication and the information code displayed on the display, first facial feature points extracted from a facial image of the user being recorded previously in the information code;
a determination step determining whether or not a stage is realized in which the imaging unit recognized, from an image imaged by the imaging unit, that the imaging unit has imaged the face of the user;
an extraction step extracting second facial feature points from an image of the user's face which has been imaged in the imaging step, when the determination step has determined that the state is realized;
a reading step decoding an image of the information code displayed on the display and imaged by the imaging unit such that the first facial feature points recorded in the information code are read, when the determination unit has determined that the state is realized;

a matching step performing matching between the first facial feature points and the second facial feature points; and an authentication step authenticating the user based on matching results performed in the matching step.

5. The authentication system according to claim 1, wherein, when it is determined by the determination unit that the state is not provided, the imaging unit is configured to continue an imaging operation thereof until when it is determined by the determination unit that the state is provided.

6. The authentication device according to claim 2, wherein, when it is determined that the state is not provided, the imaging unit is configured to continue an imaging operation thereof until it is determined by that the state is provided.

7. The authentication system according to claim 5, comprising:

a display unit configured to display the information code in a predetermined readable state thereof, wherein the imaging unit is arranged at a position within a field of view of the user who sees the display unit for the authentication.

8. The authentication system according to claim 5, comprising:

a storage unit in which the second facial feature points extracted by the extraction unit are temporarily stored, the second facial feature points being deleted after a lapse of a given period of time from the storage thereof.

9. The authentication system according to claim 5, comprising:

a lighting unit which lights illumination light towards an imaging range provided by the imaging unit, and a control unit configured to control a lighting state of the illumination light, the lighting state being provided by the lighting unit, wherein the control unit is configured to control the lighting unit such that, in a predetermined condition, the lighting state realized when the imaging unit images the user's face and the lighting state realized when the imaging unit images the information code are different from each other.

10. The authentication system according to claim 5, wherein the determination unit determines that the state is realized when the images sequentially imaged by the imaging unit include human's faces which are recognizable and which become gradually larger.

11. The authentication system according to claim 5, wherein the determination unit determines that the state is realized when an inclination of a center line, which is depicted on a human face imaged recognizably, to a reference line on the image imaged by the imaging unit is within a predetermined angular range.

12. The authentication system according to claim 5, wherein the determination unit determines that the state is realized when it is recognized that the images sequentially recognizably imaged by the imaging unit include human's faces which blink.

13. The authentication system according to claim 5, wherein the determination unit determines that the state is realized when it is recognized that the images sequentially recognizably imaged by the imaging unit include human's faces, the human's faces having light shadows which changes over the images.

14. The authentication system according to claim 5, wherein the determination unit determines that the state is realized when it is recognized that the images sequentially recognizably imaged by the imaging unit include human's faces providing a depth.

15. The authentication device according to claim 6, comprising:

a display unit configured to display the information code in a predetermined readable state thereof, wherein the imaging unit is arranged at a height position within a field of view of the user who sees the display unit.

16. The authentication device according to claim 6, comprising:

a storage unit in which the second facial feature points extracted by the control unit are temporarily stored, the second facial feature points being deleted after a lapse of a given period of time from the storage thereof.

17. The authentication device according to claim 6, comprising:

a lighting unit which lights illumination light towards an imaging range provided by the imaging unit, and wherein the computer of the control unit is programmed to control a lighting state of the illumination light such that, in a predetermined condition, the lighting state realized when the imaging unit images the user's face and the lighting state realized when the imaging unit images the information code are different from each other.

18. The authentication device according to claim 6, wherein the computer of the control unit is programmed to determine that the state is realized when the images sequentially imaged by the imaging unit include human's faces which are recognizable and which become gradually larger.

19. The authentication device according to claim 6, wherein the computer of the control unit is programmed to determine that the state is realized when an inclination of a center line, which is depicted on a human face imaged recognizably, to a reference line on the image imaged by the imaging unit is within a predetermined angular range.

20. The authentication device according to claim 6, wherein the computer of the control unit is programmed to determine that the state is realized when it is recognized that the images sequentially recognizably imaged by the imaging unit include human's faces which blink.

21. The authentication device according to claim 6, wherein the computer of the control unit is programmed to determine that the state is realized when it is recognized that the images sequentially recognizably imaged by the imaging unit include human's faces, the human's faces having light shadows which changes over the images.

22. The authentication device according to claim 6, wherein the computer of the control unit is programmed to determine that the state is realized when it is recognized that the images sequentially recognizably imaged by the imaging unit include human's faces providing a depth.

23. The authentication system according to claim 1, wherein the imaging unit is provided with one optical camera shared by imaging both the face of the user and the information code.

24. The authentication device according to claim 2, wherein the imaging unit is provided with one optical camera shared by imaging both the face of the user and the information code.

* * * * *